US011403369B2

(12) United States Patent
Farre Guiu et al.

(10) Patent No.: US 11,403,369 B2
(45) Date of Patent: Aug. 2, 2022

(54) SECURE CONTENT PROCESSING PIPELINE

(71) Applicant: Disney Enterprises, Inc., Burbank, CA (US)

(72) Inventors: Miquel Angel Farre Guiu, Bern (CH); Edward C. Drake, Stevenson Ranch, CA (US); Anthony M. Accardo, Los Angeles, CA (US); Mark Arana, Agoura Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 378 days.

(21) Appl. No.: 16/748,509

(22) Filed: Jan. 21, 2020

(65) Prior Publication Data
US 2021/0224356 A1 Jul. 22, 2021

(51) Int. Cl.
*G06F 21/10* (2013.01)
*H04L 9/32* (2006.01)
*G06N 3/08* (2006.01)

(52) U.S. Cl.
CPC ............ *G06F 21/10* (2013.01); *G06N 3/08* (2013.01); *H04L 9/3228* (2013.01)

(58) Field of Classification Search
CPC .......... G06F 21/10; G06N 3/08; H04L 9/3228
See application file for complete search history.

(56) References Cited

U.S. PATENT DOCUMENTS

| 8,885,929 | B2 | 11/2014 | Ni |
| 10,311,289 | B2 | 6/2019 | Sun |
| 10,860,692 | B1* | 12/2020 | Ur .................... H04N 7/147 |
| 2006/0132493 | A1 | 6/2006 | Akima |
| 2012/0131002 | A1 | 5/2012 | Rakshit |
| 2012/0141093 | A1 | 6/2012 | Yamaguchi et al. |

(Continued)

FOREIGN PATENT DOCUMENTS

| CN | 107944416 | 4/2018 |
| EP | 3 432 162 A2 | 1/2019 |

(Continued)

OTHER PUBLICATIONS

Singh, R.D., Aggarwal, N. Video content authentication techniques: a comprehensive survey. Multimedia Systems 24, 211-240 (2018). https://doi.org/10.1007/s00530-017-0538-9 (Year: 2018).*

(Continued)

*Primary Examiner* — Chau Le
(74) *Attorney, Agent, or Firm* — Farjami & Farjami LLP

(57) ABSTRACT

A system for securing a content processing pipeline includes a computing platform having a hardware processor and a memory storing a software code. The hardware processor executes the software code to insert a synthesized test image configured to activate one or more neurons of a malicious neural network into a content stream, provide the content stream as an input stream to a first processing node of the pipeline, and receive an output stream including a post-processed test image. The hardware processor further executes the software code to compare the post-processed test image in the output with an expected image corresponding to the synthesized test image, and to validate at least one portion of the pipeline as secure when the post-processed test image in the output matches the expected image.

20 Claims, 4 Drawing Sheets

(56) References Cited

U.S. PATENT DOCUMENTS

| | | | |
|---|---|---|---|
| 2013/0006625 | A1 | 1/2013 | Gunatilake et al. |
| 2013/0216201 | A1 | 8/2013 | Seligmann |
| 2015/0101011 | A1 | 4/2015 | Hutton |
| 2015/0227869 | A1 | 8/2015 | Saraf et al. |
| 2015/0281258 | A1 | 10/2015 | Watkins et al. |
| 2015/0379253 | A1 | 12/2015 | Cook et al. |
| 2016/0071541 | A1 | 3/2016 | Miner |
| 2016/0292437 | A1 | 10/2016 | Manmohan et al. |
| 2017/0054708 | A1 | 2/2017 | Zaw et al. |
| 2017/0134162 | A1* | 5/2017 | Code .............. H04L 9/0643 |
| 2017/0262635 | A1 | 9/2017 | Strauss et al. |
| 2017/0308681 | A1* | 10/2017 | Gould ............ G06Q 30/0248 |
| 2019/0057519 | A1 | 2/2019 | Cinnamon et al. |
| 2019/0102531 | A1 | 4/2019 | Li et al. |
| 2019/0130172 | A1 | 5/2019 | Zhong et al. |
| 2019/0267041 | A1 | 8/2019 | Ricciardi |
| 2019/0304085 | A1 | 10/2019 | Dekel-Klein et al. |
| 2019/0318156 | A1 | 10/2019 | Wu |
| 2019/0324617 | A1 | 10/2019 | Quail |
| 2019/0347666 | A1 | 11/2019 | Bermudez-Cisneros et al. |
| 2021/0357533 | A1 | 11/2021 | Britton |

FOREIGN PATENT DOCUMENTS

| | | |
|---|---|---|
| KR | 10-2015-0096211 A | 5/2015 |
| KR | 10-2019-0042984 A | 4/2019 |
| WO | WO 03/067850 | 8/2003 |
| WO | WO 2020/003150 A2 | 1/2020 |
| WO | WO 2020/014286 A1 | 1/2020 |

OTHER PUBLICATIONS

Science, ODSC—Open Data. "Using AI to Combat Deepfakes and Fake News." *Medium,* Medium, Sep. 26, 2019, medium.com/@ODSC/using-ai-to-combat-deepfakes-and-fake-news-3f9d221654fa.

Parikh, S.B., Atrey, P.K.: Media-rich fake news detection: a survey. In: 2018 IEEE Conference on Multimedia Information Processing and Retrieval (MIPR), pp. 436-441, Apr. 2018. https://doi.org/10.1109/MIPR.2018.00093.

Collins, Connor. "DARPA Tackles Deepfakes With AI." *Government CIO Media & Research,* Mar. 11, 2019.

PCT International Search Report dated Apr. 16, 2021 for PCT/US2021/012050.

PCT Written Opinion of the International Searching Authority dated Apr. 19, 2021 for PCT/US2021/012050.

PCT International Search Report dated Apr. 20, 2021 for PCT/US2021/012093.

PCT Written Opinion of the International Searching Authority dated Apr. 20, 2021 for PCT/US2021/012093.

U.S. Appl. No. 16/679,016, filed Nov. 8, 2019. "Chain-of-Manipulation Tracking of Audio-Video Content.".

Fingas, Jon. "Adobe, Twitter and the New York Times Team up to Fight Digital Fakes." *Engadget,* Nov. 4, 2019, www.engadget.com/2019/11/04/adobe-twitter-nyt-digital-content-attribution/.

"Adobe, The New York Times Company and Twitter Announce Content Authenticity Initiative to Develop Industry Standard for Content Attribution." *Adobe Newsroom,* news.adobe.com/press-release/corporate/adobe-new-york-times-company-and-twitter-announce-content-authenticity.

Extended European Search Report in EP Application Serial No. 20197984.6.

"Digital video tempering detection: An overview of passive techniques" by Sitara et al. (Elsevier Ltd. 2016).

PCT International Search Report dated Apr. 27, 2021 for PCT/US2021/012090.

PCT Written Opinion of the International Searching Authority dated Apr. 27, 2021 for PCT/US2021/012090.

PCT International Search Report dated Apr. 27, 2021 for PCT/US2021/012096.

PCT Written Opinion of the International Searching Authority dated Apr. 27, 2021 for PCT/US2021/012096.

* cited by examiner

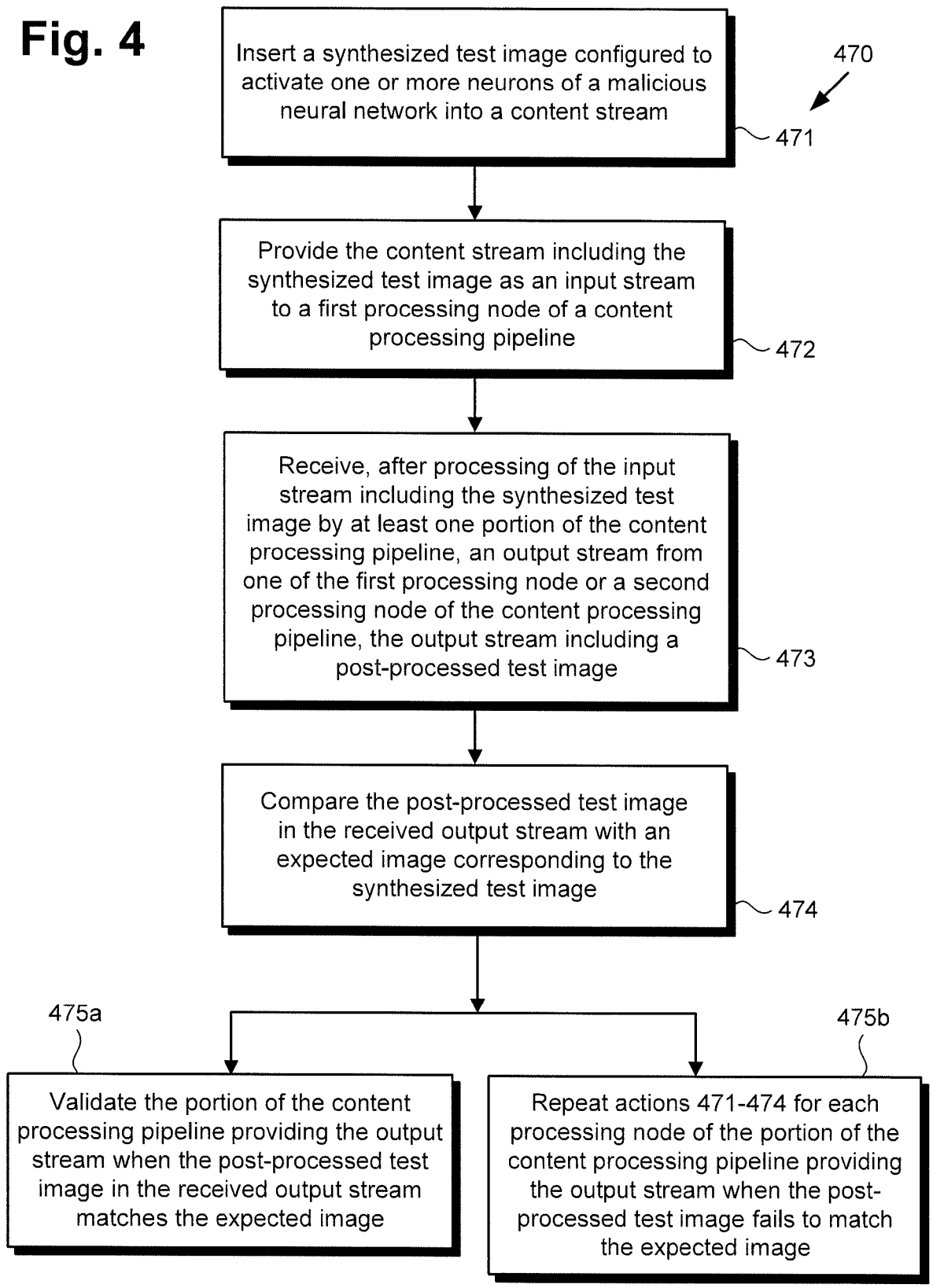

SECURE CONTENT PROCESSING PIPELINE

BACKGROUND

Advances in machine learning have enabled the production of realistic but forged recreations of a person's image or voice, known as "deepfakes" due to the use of deep artificial neural networks for their creation. Deepfakes may be produced without the consent of the person whose image or voice is being used, and may make the person being represented appear to say or do something that they have in fact not said or done. As a result, deepfake manipulated digital content can be used maliciously to spread misinformation.

Due to the widespread popularity of digital content for the distribution of entertainment and news, ensuring data security of a processing pipeline for the digital content is vitally important to its creators, owners and distributors alike. However, as machine learning models continue to improve, detection of malware capable of producing deepfakes and introduced into one or more processing nodes of a content processing pipeline will continue to be challenging. As a result, in the absence of a robust and reliable solution for assessing content processing pipeline security, subtly manipulated or even substantially fake digital content may inadvertently be broadcast or otherwise distributed in violation of contractual agreement or regulatory restrictions, thereby subjecting the content owners and/or distributors to potential legal jeopardy.

SUMMARY

There are provided systems and methods for securing a content processing pipeline, substantially as shown in and/or described in connection with at least one of the figures, and as set forth more completely in the claims.

BRIEF DESCRIPTION OF THE DRAWINGS

FIG. 4 shows a flowchart presenting an exemplary method for securing a content processing pipeline, according to one implementation.

DETAILED DESCRIPTION

Figure 1:
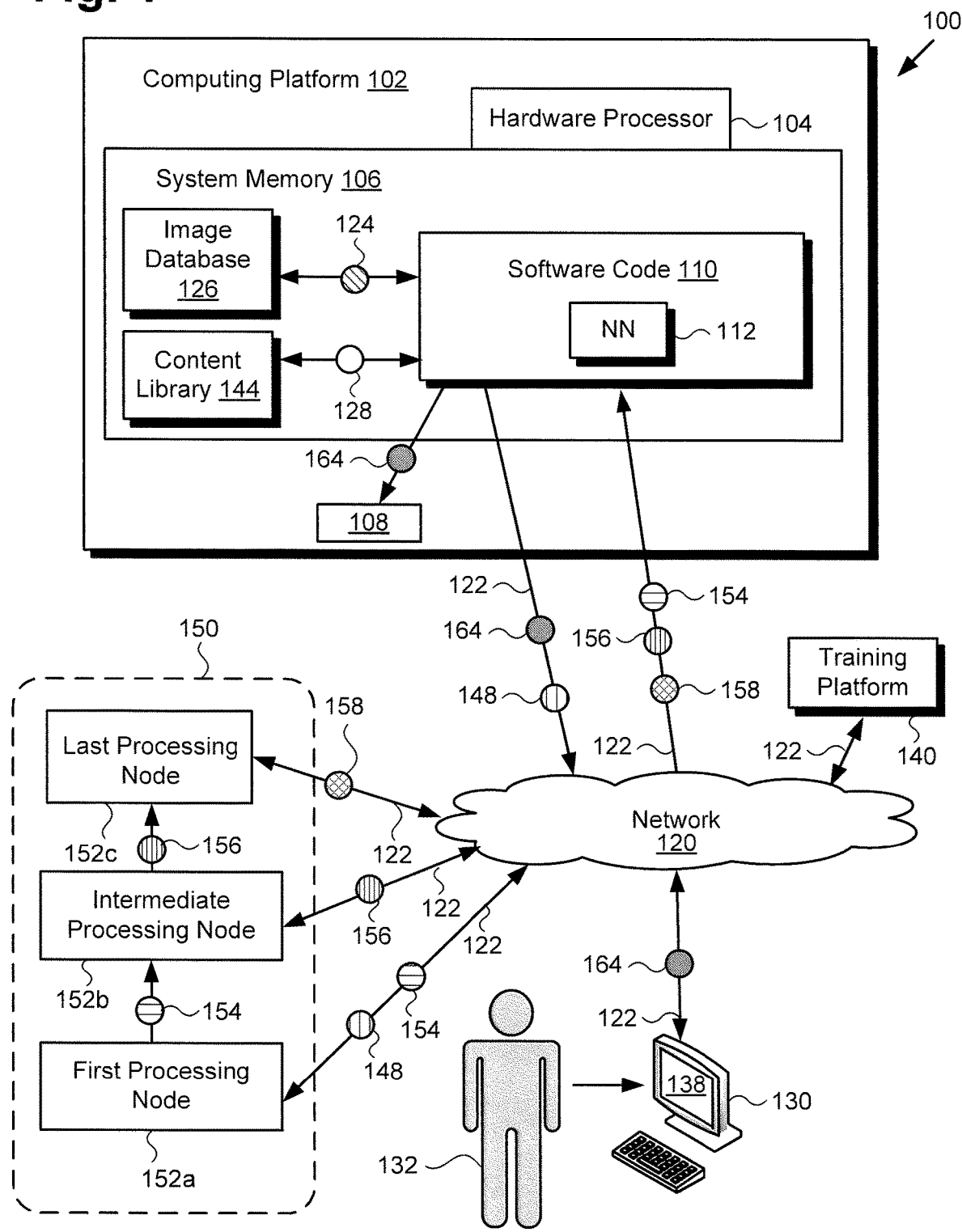
FIG. 1 shows a diagram of an exemplary system for securing a content processing pipeline, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for securing a content processing pipeline that overcome the drawbacks and deficiencies in the conventional art. By inserting a synthesized test image configured to activate one or more neurons of a malicious neural network into a content stream provided as an input stream to a content processing pipeline, the present security solution advantageously enables detection of the malicious neural network when it is present in the pipeline. In addition, by comparing the synthesized test image included in an output stream received from one or more content processing nodes of the pipeline to an expected image corresponding to the synthesized test image, the present solution enables identification of the node or nodes of the pipeline infected by the malicious neural network.

It is noted that, in some implementations, the present security solution may be performed as a substantially automated process by a substantially automated system. It is further noted that, as used in the present application, the terms "automation," "automated", and "automating" refer to systems and processes that do not require the participation of a human user, such as a system administrator. Although, in some implementations, a human system operator or administrator may review the security assessments produced by the automated systems and according to the automated methods described herein, that human involvement is optional. Thus, the methods described in the present application may be performed under the control of hardware processing components of the disclosed automated systems.

It is also noted that, as defined in the present application, a neural network (NN), also known as an artificial neural network (ANN), is a type of machine learning framework in which patterns or learned representations of observed data are processed using highly connected computational layers that map the relationship between inputs and outputs. A "deep neural network," in the context of deep learning, may refer to a neural network that utilizes multiple hidden layers between input and output layers, which may allow for learning based on features not explicitly defined in raw data. As such, various forms of NNs may be used to make predictions about new data based on past examples or "training data." In various implementations, NNs may be utilized to perform image processing or natural-language processing.

FIG. 1 shows a diagram of an exemplary system for securing a content processing pipeline, according to one implementation. As shown in FIG. 1, system 100 includes computing platform 102 having hardware processor 104, system memory 106 implemented as a non-transitory storage device, and optional display 108. According to the present exemplary implementation, system memory 106 stores software code 110 including optional NN 112, as well as content library 144 providing content stream 128, and image database 126 including one or more synthesized test images 124 (hereinafter "test image(s) 124").

Figure 3:
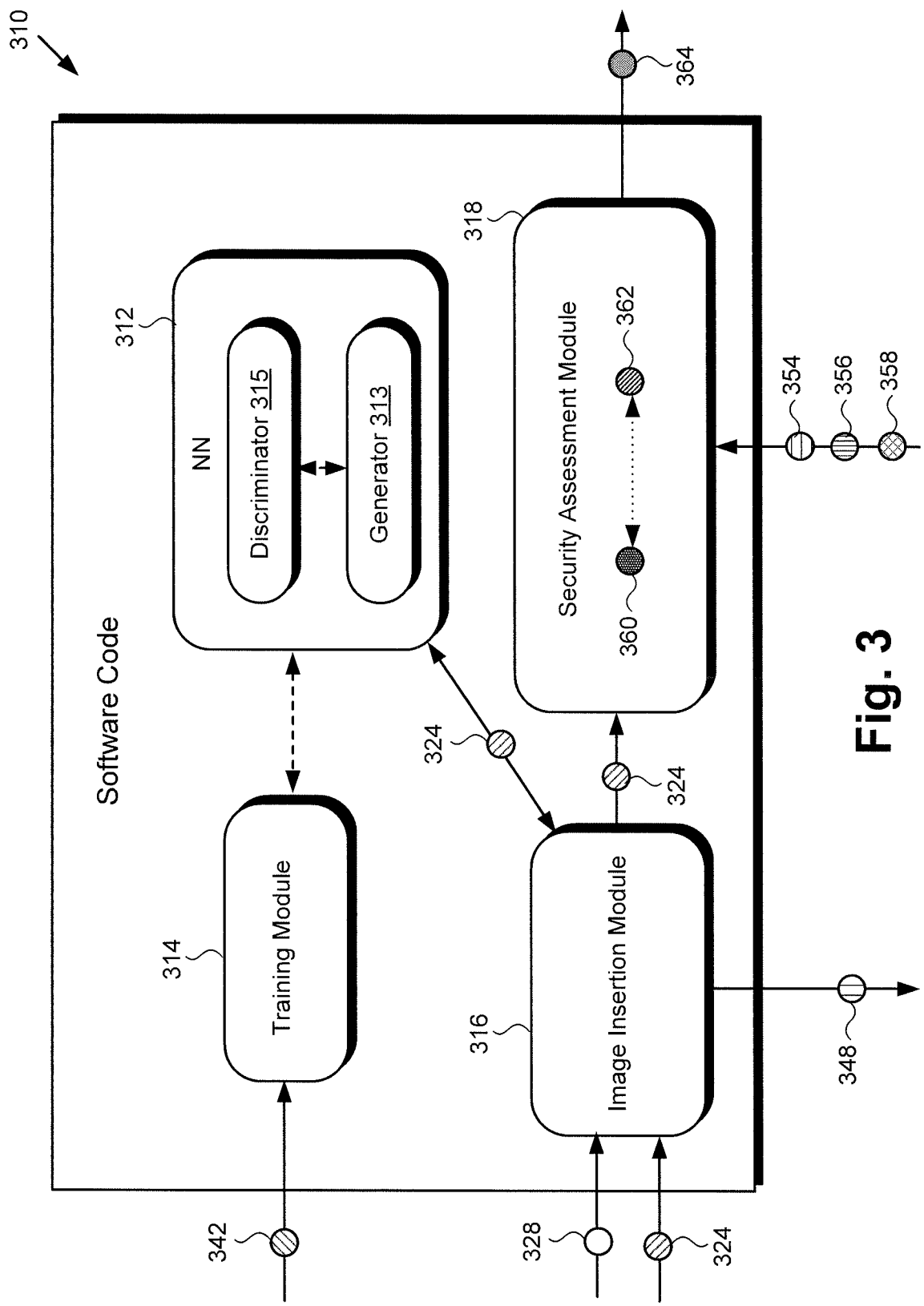
FIG. 3 shows an exemplary software code suitable for use by the system shown in FIG. 1, according to one implementation.

It is noted that, as shown by FIG. 3 and described below, in some implementations in which software code 110 includes optional NN 112 (NN 312 in FIG. 3), NN 112 may be implemented as a generative adversarial network (GAN) including a discriminator configured to model a malicious neural network (hereinafter "malicious NN"), such as a deepfake NN. In those implementations, NN 112 may be used to produce synthesized test image 124, which may be subsequently stored on and obtained from image database 126.

As further shown in FIG. 1, system 100 is implemented within a use environment including training platform 140, content processing pipeline 150 including first processing node 152a, intermediate processing node 152b, and last processing node 152c, as well as communication network 120, and system administrator or other user 132 (hereinafter "user 132") utilizing user system 130 including display 138. In addition, FIG. 1 shows network communication links 122 communicatively coupling training platform 140, content processing pipeline 150, and user system 130 with system 100 via communication network 120.

Furthermore, FIG. 1 shows input stream 148 to first processing node 152a of content processing pipeline 150, as well as processed content streams received by system 100 as output streams 154, 156, and 158 from respective first processing node 152a, intermediate processing node 152b, and last processing node 152c of content processing pipeline 150. Also shown in FIG. 1 is security assessment 164 of at least some portion of content processing pipeline 150, generated by system 100.

Although FIG. 1 depicts content processing pipeline 150 as including three processing nodes represented by first processing node 152a, intermediate processing node 152b, and last processing node 152c, that representation is merely exemplary. In other implementations, content processing pipeline 150 may include as few as one processing node, or more, or many more than three processing nodes. Thus, in some implementations, any one of first processing node 152a, intermediate processing node 152b, and last processing node 152c may be the first as well as the last processing node of content processing pipeline 150, while in other implementations, intermediate processing node 152b may include a plurality of processing nodes linking first processing node 152a and last processing node 152c.

It is noted that first processing node 152a, intermediate processing node 152b, and last processing node 152c, can be implemented as any one of a variety of image processing devices. That is to say, one or more of first processing node 152a, intermediate processing node 152b, and last processing node 152c may take the form of a digital camera, a video editing workstation, a desktop, laptop, or tablet computer, a smartphone, or a cloud-based data storage service device, to name a few examples.

Software code 110, when executed by hardware processor 104 of computing platform 102, is configured to produce security assessment 164 of at least a portion of content processing pipeline 150 using synthesized test image 124, as described in greater detail below. Although the present application refers to software code 110, image database 126, and content library 144 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts training platform 140 and user system 130 as computer platforms is remote from system 100, that representation is also merely exemplary.

More generally, system 100 may include one or more computing platforms, such as computer servers for example, which may form an interactively linked but distributed system, such as a cloud based system, for instance. As a result, hardware processor 104 and system memory 106 may correspond to distributed processor and memory resources within system 100, while training platform 140 may be a component of system 100 or may be implemented as a software module stored in system memory 106. Furthermore, in some implementations, user system 130 may be included as an element of system 100.

In one implementation, computing platform 102 of system 100 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

It is noted that although user system 130 is shown as a desktop computer in FIG. 1, that representation is also provided merely as an example. More generally, user system 130 may be any suitable system that implements data processing capabilities sufficient to provide a user interface, support connections to communication network 120, and implement the functionality ascribed to user system 130 herein. For example, in other implementations, user system 130 may take the form of a laptop computer, tablet computer, or smartphone, for example.

It is also noted that, in various implementations, display 108 may be physically integrated with computing platform 102 or may be communicatively coupled to but physically separate from computing platform 102. Moreover, display 138 of user system 130 may be physically integrated with user system 130 or may be communicatively coupled to but physically separate from user system 130. For example, where user system 130 is implemented as a smartphone, laptop computer, or tablet computer, display 138 will typically be integrated with user system 130. By contrast, where user system 130 is implemented as a desktop computer, display 138 may take the form of a monitor separate from user system 130 in the form of a computer tower. Display 108 of system 100 and display 138 of user system 130 may be implemented as liquid crystal displays (LCDs), light-emitting diode (LED) displays, organic light-emitting diode (OLED) displays, or any other suitable display screens that perform a physical transformation of signals to light.

Figure 2:
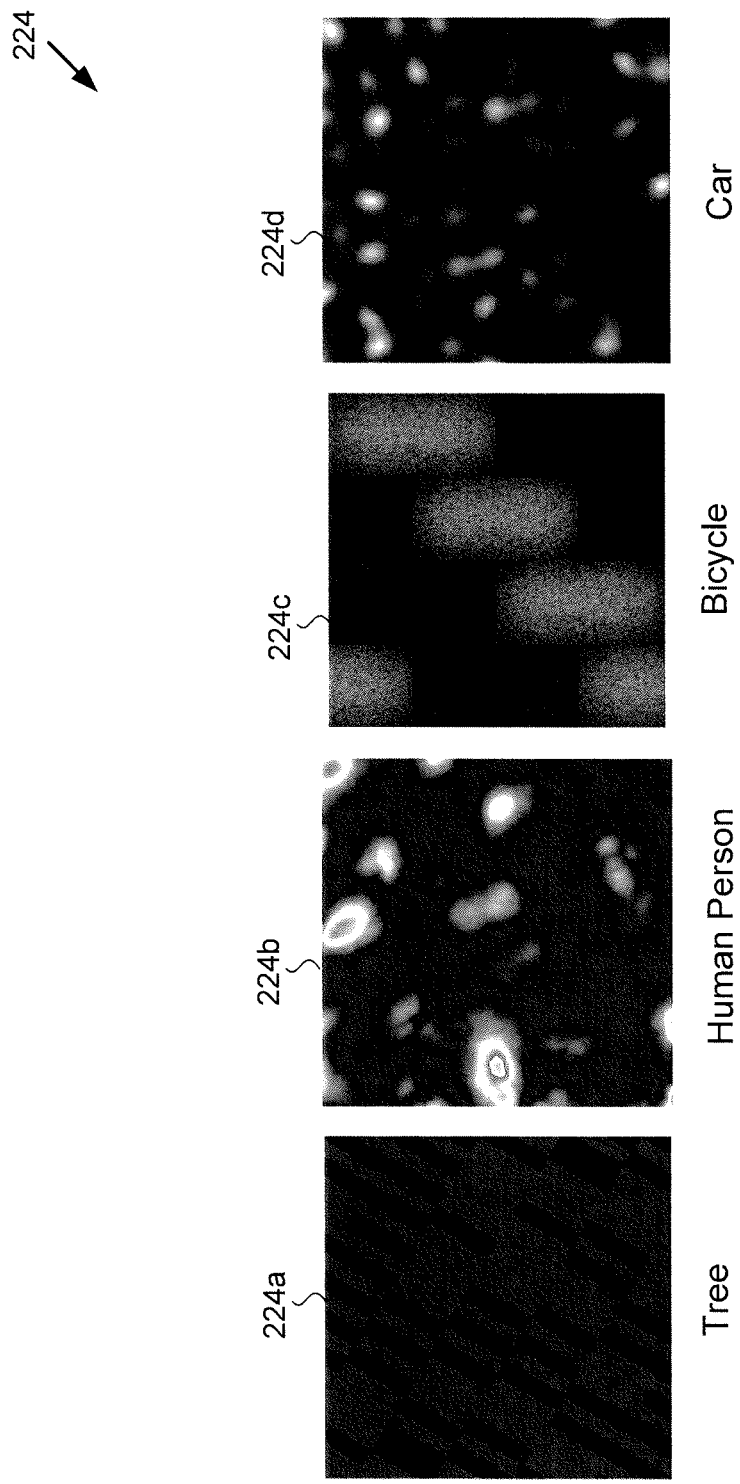
FIG. 2 shows exemplary synthesized test images suitable for use in assessing content processing pipeline security, according to one implementation.

FIG. 2 shows exemplary synthesized test images 224 suitable for use in assessing content processing pipeline security, according to one implementation. As shown in FIG. 2, synthesized test images 224 are "nonsense" images unrecognizable to a human observer. However, synthesized test images 224 are configured to be mistaken for recognizable objects by a malicious NN fully trained using popular and widely available training data sets and architectures or fine-tuned on top of a neural net initially trained with one of those datasets and architectures, thereby causing the malicious NN to "hallucinate" objects that are not actually depicted in synthesized test images 224. It is noted that, as defined for the purposes of the present application, a malicious NN is characterized as "hallucinating" when the score of one or more neurons in the NN is substantially maximized in response to synthesized images 224.

For example, synthesized test image 224a is configured to cause a malicious NN to identify the pattern depicted in that image as a tree, despite being unrecognizable as any specific object to a human observer. Analogously, synthesized test image 224b is configured to cause a malicious NN to hallucinate a human person, synthesized test image 224c is configured to cause a malicious NN to hallucinate a bicycle, and synthesized test image 224d is configured to cause a malicious NN to hallucinate a car, by way of example.

Synthesized test images 224 correspond in general to synthesized test image(s) 124 in FIG. 1. As a result, synthesized test image(s) 124 may share any of the characteristics attributed to synthesized test images 224 by the present disclosure, and vice versa. Thus, like synthesized test images 224, synthesized test image(s) 124 is/are unrecognizable to a human observer of synthesized test image(s) 124, but is/are nevertheless configured to be identified as one or more recognizable objects by a malicious NN. The state-of-the-art in deep learning shows that it is possible to produce, i.e., synthesize, images that are completely unrecognizable to humans, but that state-of-the-art NNs believe to be recognizable objects with almost complete confidence.

As a result, synthesized test image(s) 124/224 may be used to detect and thwart so called "man in the middle" attacks. Man in the middle attacks can happen as a result of interception of data communications within content processing pipeline 150. Alternatively, a man in the middle attack may occur as a result malware installed during a firmware update to one or more of first processing node 152a, intermediate processing node 152b, and last processing node 152c, for example due to a camera firmware update or a security breach in the cloud.

The types of synthesized test images 124/224 that will cause a malicious NN configured to produce a deepfake to instead hallucinate will depend on the architecture of the malicious NN, as well as the dataset used for its training. The present content processing pipeline security solution utilizes one or more synthesized test images configured to fool the most popular NN architectures trained based on commonly used training data sets, such as the ResNet, you only look once (YOLO), and Visual Geometry Group (VGG) architectures, trained with ImageNet or 'Labeled Faces in the Wild,' for example. As a result, synthesized test image(s) 124/224 is/are configured to activate one or more neurons of the malicious NN.

For example, if a malicious NN configured as a deepfake NN interprets synthesized test image(s) 124/224 to include a face, such as synthesized test image 224b, for instance, it will typically transform the synthesized test image in an unexpected way. By comparing a synthesized test image supplied as an input to content processing pipeline 150 after processing by at least a portion of the pipeline to an expected image corresponding to the synthesized test image, the present security solution enables detection of a man in the middle attack that uses a malicious NN.

FIG. 3 shows exemplary software code 310 suitable for use by system 100 in FIG. 1, according to one implementation. As shown in FIG. 3, software code 310 includes training module 314, NN 312, image insertion module 316, and security assessment module 318. In addition, FIG. 3 shows training data 342, content stream 328, one or more synthesized test images 324 (hereinafter "test image(s) 324"), input stream 348 to content processing pipeline 150, in FIG. 1, and output streams 354, 356, and 358 received from content processing pipeline 150. Also shown in FIG. 3 are synthesized test image(s) 324 after processing by at least a portion of content processing pipeline 150 (hereinafter "post-processed test image(s) 360"), one or more expected images 362 corresponding respectively to synthesized test image(s) 324 (hereinafter "expected image(s) 362"), and security assessment 364.

Software code 310 including NN 312, content stream 328, input stream 348 to content processing pipeline 150, output streams 354, 356, and 358 received from content processing pipeline 150, and security assessment 364 correspond respectively in general to software code 110 including NN 112, content stream 128, input stream 148, output streams 154, 156, and 158, and security assessment 164, in FIG. 1. That is to say, software code 110, NN 112, content stream 128, input stream 148, output streams 154, 156, and 158, and security assessment 164 may share any of the characteristics attributed to respective software code 310, NN 312, content stream 328, input stream 348, output streams 354, 356, and 358, and security assessment 364 by the present disclosure, and vice versa. Thus, although not shown explicitly in FIG. 1, software code 110 may include features corresponding to each of training module 314, image insertion module 316, and security assessment module 318, as well as optional NN 112/312.

In addition, synthesized test image(s) 324, in FIG. 3, correspond in general to synthesized test image(s) 124/224 in FIGS. 1 and 2. In other words, synthesized test image(s) 324 may share any of the characteristics attributed to synthesized test image(s) 124/224 by the present disclosure, and vice versa. Thus, like synthesized test image(s) 124/224, synthesized test image(s) 324 may be unrecognizable to a human observer, but may nevertheless by configured to cause a malicious NN to hallucinate by identifying a synthesized test image as a recognizable object.

The functionality of system 100 including software code 110/310 will be further described by reference to FIG. 4 in combination with FIGS. 1, 2, and 3. FIG. 4 shows flowchart 470 presenting an exemplary method for securing a content processing pipeline, according to one implementation. With respect to the method outlined in FIG. 4, it is noted that certain details and features have been left out of flowchart 470 in order to not obscure the discussion of the inventive features in the present application.

As a preliminary matter, two exemplary implementations of content processing pipeline 150 are herein described in greater detail in the interests of conceptual clarity. However, it is emphasized that the specific implementational details disclosed in the present application are merely by way of example, and are not to be interpreted as limiting the scope of the present inventive concepts in any way.

For example, in one implementation content processing pipeline 150 may include six nodes, i.e., first processing node 152a, four intermediate processing nodes 152b, and last processing node 152c. In one such implementation, first processing node 152a may be a mobile unit including a video camera. Content generated by first processing node 152a is transferred to intermediate processing node 152b in the form of a video transcoder, which, in turn, may output the transcoded video to another intermediate processing node 152b in the form of a segmenter configured to partition and package the content. The content output by the segmenter may be transferred to another intermediate processing node 152b in the form of a video production facility, where it is processed by another intermediate processing node 152b in the form of a color correction system. Finally, last processing node 152c may add additional text and/or graphic overlays to the content and broadcast the content to an audience of consumers of the video content.

Alternatively, in another implementation, first processing node 152a may be a camera capturing video of a green screen stage in a television studio. Content generated by first processing node 152a is transferred to intermediate processing node 152b in the form of a video transcoder, which, in turn, may transfer the transcoded video to another intermediate processing node 152b in the form of an online application for previsualization of the video content. The previsualized video content may then be transferred to another intermediate processing node 152b in the form of a color correction system, followed by transfer to last processing node 152c in the form of a playback system or device enabling user 132 to preview the video content prior to its distribution to consumers.

It is noted that in some implementations, content processing pipeline 150 may include a processing node, e.g., first processing node 152a, configured to create original content prior to processing of that original content by other processing nodes of content processing pipeline 150. However, in other implementations, content processing pipeline 150 may receive content created outside of content processing pipeline 150, for example by a third party content creator, such as an authorized field reporter using a mobile videography device, or from an amateur user submitting images captured using a smartphone video or still image camera, for instance.

Referring now to FIG. 4 in combination with FIGS. 1, 2, and 3, flowchart 470 begins with inserting synthesized test image(s) 124/224/324 into content stream 128/328, synthesized test image(s) 124/224/324 being configured to activate one or more neurons of a malicious NN (action 471). Content stream 128/328 may be a digital content stream including a sequence of digital photographs, or a video clip, for example. Synthesized test image(s) 124/224/324 may be inserted into content stream 128/328 by being appended to the beginning or end of content stream 128/328, or by being inserted between photographic images or video frames of content stream 128/328. In one implementation, synthesized test image(s) 124/224/324 may be inserted into content stream 128/328 when a hash value of content included in content stream 128/328 is embedded or appended to content stream 128/328. Synthesized test image(s) 124/224/324 may be inserted into content stream 128/328 by software code 110/310, executed by hardware processor 104, and using image insertion module 316.

It is noted that, in some implementations, software code 110/310 may obtain previously produced synthesized test image(s) 124/224/324 from image database 126. However, in other implementations, software code 110/310 may include optional NN 112/312. In those implementations, hardware processor 104 may execute software code 110/310 to produce synthesized test image(s) 124/224/324 using NN 112/312. For example, in some implementations, NN 112/312 may be a GAN including generator 313 used to produce modifications to a random image, and including discriminator 315 implemented as a model of the target malicious NN architecture.

In implementations in which NN 112/312 is used to produce synthesized test image(s) 124/224/324, NN 112/312 must be trained prior to action 471. NN 112/312 may be trained using training platform 140, training data 342, and training module 314 of software code 110/310. The goal of training is to synthesize test images that are unrecognizable to a human observer but are likely to be identified as a recognizable object by the target malicious NN.

During training, discriminator 315 of NN 112/312 may look at a synthesized test image output by generator 313 and determine whether it convincingly depicts a recognizable object. Validation of the learning process during training may be performed by user 132, who may utilize user system 130 to evaluate synthesized test image(s) 124/224/324. However, in some implementations, validation of the learning can be performed as an automated process using discriminator 315. Once training is completed, software code 110/310 including NN 112/312 may be utilized in an automated process to produce synthesized test image(s) 124/224/324.

In some implementation, a single synthesized test image 124/224/324 may be inserted into content stream 128/328 in action 471. However, in other implementations, it may be advantageous or desirable to insert multiple synthesized test images 124/224/324 into content stream 128/328. For example, because any one of synthesized test image 124/224/324 may or may not activate a malicious NN and cause it to hallucinate, the insertion of multiple synthesized test images 124/224/324 increases the likelihood that the presence of a malicious NN in content processing pipeline 150 will be detected. When multiple synthesized test images 124/224/324 are inserted into content stream 128/328, those synthesized test images 124/224/324 may be grouped together, for example, at the beginning of content stream 128/328, or may distributed throughout content stream 128/328.

Flowchart 470 continues with providing content stream 128/328 including synthesized test image(s) 124/224/324 as input stream 148/348 to first processing node 152a of content processing pipeline 150 (action 472). As shown by FIG. 1, input stream 148/348 may be provided to first processing node 152a of content processing pipeline 150 by being transmitted to first processing node 152a via communication network 120 and network communication links 122. Action 472 may be performed by software code 110/310, executed by hardware processor 104. In some implementations, input stream 148/348 including synthesized test image(s) 124/224/324 may be provided to content processing pipeline 150 periodically, such as one a day, or every few hours for example.

Flowchart 470 continues with receiving, after processing of input stream 148/348 including synthesized test image(s) 124/224/324 by at least one portion of content processing pipeline 150, an output stream from one of first processing node 152a or a second processing node 152b of content processing pipeline 150, the output stream including post-processed test image(s) 360 (action 473). In some implementations, system 100 may produce security assessment 164/364 of first processing node 152a alone. In those implementations, hardware processor 104 may execute software code 110/310 to receive output stream 154/354 from first processing node 152a via communication network 120 and network communication links 122 in action 473.

In other implementations, system 100 may produce security assessment 164/364 of first processing node 152a and one or more intermediate processing nodes 152b. In those implementations, hardware processor 104 may execute software code 110/310 to receive output stream 156/356 from a second processing node included in one or more intermediate processing nodes 152b via communication network 120 and network communication links 122 in action 473.

In still other implementations, system 100 may produce security assessment 164/364 of the entirety of content processing pipeline 150. In those more comprehensive implementations, hardware processor 104 may execute software code 110/310 to receive output stream 158/358 from last processing node 152c via communication network 120 and network communication links 122 in action 473. Action 473 may be performed by software code 110/310, executed by hardware processor 104.

Flowchart 470 continues with comparing post-processed test image(s) 360 in the received output stream with expected image(s) 362 corresponding respectively to synthesized test image(s) 124/224/324 (action 474). Expected image(s) 362 may be substantially identical to synthesized test image(s) 124/224/324, or may be synthesized test image(s) 124/224/324 modified by predictable transformations imposed by the processing performed by one or more processing nodes of content processing pipeline 150. Comparison of post-processed test image(s) 360 with expected image(s) 362 may be performed by software code 110/310, executed by hardware processor 104, and using security assessment module 318.

In some implementations, as shown in FIG. 4, flowchart 470 may conclude with validating the at least one portion of content processing pipeline 150 assessed for security as secure when post-processed test image(s) 360 matches/match expected image(s) 362 (action 475a). As noted above, in use cases in which a malicious NN is present in the portion of content processing pipeline 150 being assessed, the manipulation of synthesized test image(s) 124/224/324 by the malicious NN will result in post-processed test image(s) 360 having unexpected features not present in expected image(s) 362. As a result, a match between post-processed test image(s) 360 and expected image(s) 362 advantageously establishes the absence of a malicious NN within the portion of content processing pipeline 150 assessed in actions 471, 472, 473, 474, and 475a, thereby validating data security in that portion of the pipeline.

In implementations in which a single synthesized test image 124/224/324 is inserted into content stream 128/328 in action 471, a single post-processed test image 360 is compared to a single expected image 362. However, in implementations in which multiple synthesized test image(s) 124/224/324 are inserted into content stream 128/328, each of multiple post-processed test images 360 are compared to a corresponding one of expected images 362. In those latter implementations, validation of the portion of content pipeline assessed in actions 471, 472, 473, and 474 (hereinafter "actions 471-474") may require that each of post-processed test images 360 match its respective expected image 362.

In some implementations, it may be advantageous or desirable to assess the security of content processing pipeline 150 as a whole. For example, where output stream 158/358 is received from last processing node 152c of content processing pipeline 150 in action 473, the entirety of content processing pipeline 150 can be validated as secure when post-processed test image(s) 360 matches/match expected image 362. However, in other implementations, it may advantageous or desirable to assess the security of content processing pipeline by assessing the security of each processing node individually. In those latter implementations, for example, actions 471-474 may be performed for each of first processing node 152a, intermediate processing node 152b, and last processing node 152c.

Conversely, where post-processed test image(s) 360 fail to match expected image(s) 362, the method outlined by flowchart 470 advantageously detects the likely presence of a malicious NN on at least one processing node of content processing pipeline 150. In those situations, actions 471, 472, 473, and 474 may be repeated for each processing node of the portion of content processing pipeline 150 providing the output stream received in action 473, or for subsets of those processing nodes (action 475b). For example, where input stream 148/348 including synthesized test image(s) 124/224/324 is provided to first processing node 152a and post-processed test image(s) 360 included in output stream 158/358 received from last processing node 152c fails/fail to match expected image(s) 362, input stream 148/348 may be provided anew to first processing node 152a, but this time post-processed test image(s) 360 included in output stream 156/356 received from intermediate processing node 152b could be compared with expected image(s) 362. If post-processed test image(s) 360 included in output stream 156/356 matches/match expected image(s) 362 but post-processed test image(s) 360 included in output stream 158/358 does/do not, first processing node 152a and intermediate processing node 152b can by validated as secure, while the image manipulations performed by the malicious NN are advantageously identified as being isolated to last processing node 152c.

It is noted that, in some implementations, hardware processor 104 may execute software code 110/310 to perform the actions outlined in flowchart 470 to produce security assessment 164/364 in an automated process from which human involvement may be omitted. That is to say, in those implementations, system 100 is configured to produce security assessment 164/364 automatically. Moreover, in some implementations, hardware processor 104 may further execute software code 110/310 to render security assessment 164/464 on display 108 of system 100. Alternatively, in some implementations, hardware processor 104 may execute software code 110/310 to transmit security assessment 164/364 to user system 130, via communication network 120 and network communication links 122, for rendering on display 138 of user system 130.

Thus, the present application discloses systems and methods for securing a content processing pipeline that overcome the drawbacks and deficiencies in the conventional art. As described above, by inserting a synthesized test image configured to activate one or more neurons of a malicious NN into a content stream provided as an input stream to a content processing pipeline, the present security solution advantageously enables detection of the malicious NN when it is present in the pipeline. In addition, by comparing the synthesized test image included in an output stream received from one or more content processing nodes of the pipeline to an expected image corresponding to the synthesized test image, the present solution enables identification of the node or nodes of the pipeline infected by the malicious NN.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system configured to ensure data security of a content processing pipeline including a plurality of processing nodes, the system comprising:
    a computing platform including a hardware processor and a system memory;
    a software code stored in the system memory;
    the hardware processor being configured to execute the software code to produce a security assessment of at least one portion of the content processing pipeline by:

inserting a synthesized test image into a content stream, the synthesized test image being configured to activate one or more neurons of a malicious neural network;
providing the content stream including the synthesized test image as an input stream to a first processing node of the plurality of processing nodes of the content processing pipeline;
receiving an output stream from one of the first processing node or a second processing node of the plurality of processing nodes of the content processing pipeline, the output stream including a post-processed test image;
comparing the post-processed test image in the received output stream with an expected image corresponding to the synthesized test image; and
validating the at least one portion of the content processing pipeline as secure when the post-processed test image in the received output stream matches the expected image.

2. The system of claim 1, wherein the received output stream is from the second processing node of the plurality of processing nodes of the content processing pipeline, wherein the second processing node is a last processing node of the content processing pipeline, and wherein an entirety of the content processing pipeline is validated as secure when the synthesized test image in the received output stream matches the expected image.

3. The system of claim 1, wherein the software code comprises a neural network (NN) trained to produce the synthesized test image, and wherein the hardware processor is configured to further execute the software code to produce the synthesized test image using the NN.

4. The system of claim 3, wherein the NN comprises a generative adversarial network (GAN).

5. The system of claim 4, wherein the GAN includes a discriminator configured to model the malicious neural network.

6. The system of claim 4, wherein the GAN includes a discriminator configured to model a deepfake neural network.

7. The system of claim 1, wherein the plurality of processing nodes of the content processing pipeline comprise image processing devices.

8. The system of claim 1, wherein the hardware processor is configured to execute the software code to produce the security assessment automatically.

9. A method for use by a system including a computing platform having a hardware processor and a system memory storing a software code to produce a security assessment of at least one portion of a content processing pipeline including a plurality of processing nodes, the method comprising:
inserting, by the software code executed by the hardware processor, a synthesized test image into a content stream as a test image, the synthesized test image being configured to activate one or more neurons of a malicious neural network;
providing, by the software code executed by the hardware processor, the content stream including the synthesized test image as an input stream to a first processing node of the plurality of processing nodes of the content processing pipeline;
receiving, by the software code executed by the hardware processor, an output stream from one of the first processing node or a second processing node of the plurality of processing nodes of the content processing pipeline, the output stream including a post-processed test image;
comparing, by the software code executed by the hardware processor, the post-processed test image in the received output stream with an expected image corresponding to the synthesized test image; and
validating, by the software code executed by the hardware processor, the at least one portion of the content processing pipeline as secure when the post-processed test image in the received output stream matches the expected image.

10. The method of claim 9, wherein the received output stream is from the second processing node of the plurality of processing nodes of the content processing pipeline, wherein the second processing node is a last processing node of the content processing pipeline, and wherein an entirety of the content processing pipeline is validated as secure when the synthesized test image in the received output stream matches the expected image.

11. The method of claim 9, wherein the software code comprises a neural network (NN) trained to produce the synthesized test image, and wherein the method further comprises producing, by the software code executed by the hardware processor, the synthesized test image using the NN.

12. The method of claim 11, wherein the NN comprises a generative adversarial network (GAN).

13. The method of claim 12, wherein the GAN includes a discriminator configured to model the malicious neural network.

14. The method of claim 12, wherein the GAN includes a discriminator configured to model a deepfake neural network.

15. The method of claim 9, wherein the plurality of processing nodes of the content processing pipeline comprise image processing devices.

16. The method of claim 9, wherein the hardware processor is configured to execute the software code to produce the security assessment automatically.

17. A computer-readable non-transitory medium having stored thereon instructions, which when executed by a hardware processor, instantiate a method comprising:
inserting a synthesized test image into a content stream as a test image, the synthesized test image being configured to activate one or more neurons of a malicious neural network;
providing the content stream including the synthesized test image as an input stream to a first processing node of a plurality of processing nodes of a content processing pipeline;
receiving an output stream from one of the first processing node or a second processing node of the plurality of processing nodes of the content processing pipeline, the output stream including a post-processed test image;
comparing the post-processed test image in the received output stream with an expected image corresponding to the synthesized test image; and
validating at least one portion of the content processing pipeline as secure when the post-processed test image in the received output stream matches the expected image.

18. The computer-readable non-transitory medium of claim 17, wherein the received output stream is from the second processing node of the plurality of processing nodes of the content processing pipeline, wherein the second processing node is a last processing node of the content processing pipeline, and wherein an entirety of the content processing pipeline is validated as secure when the synthesized test image in the received output stream matches the expected image.

19. The computer-readable non-transitory medium of claim 17, wherein the computer-readable non-transitory medium stores a neural network (NN) trained to produce the synthesized test image, and wherein the method further comprises producing the synthesized test image using the NN.

20. The computer-readable non-transitory medium of claim 19, wherein the NN comprises a generative adversarial network (GAN) including a discriminator configured to model the malicious neural network.

* * * * *